United States Patent
Dona et al.

(10) Patent No.: US 6,381,071 B1
(45) Date of Patent: Apr. 30, 2002

(54) LENTICULAR DEVICE

(75) Inventors: Marinus Josephus Jakobus Dona; Josephus Johannes Maria Braat, both of Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/671,912

(22) Filed: Sep. 28, 2000

(30) Foreign Application Priority Data

Sep. 30, 1999 (EP) .............................. 99203186

(51) Int. Cl.$^7$ .......................... G02B 27/10; G03B 21/56
(52) U.S. Cl. ...................... 359/621; 359/626; 359/619; 359/455
(58) Field of Search ................. 359/619, 620, 359/621, 622, 623, 624, 626, 455, 542

(56) References Cited

U.S. PATENT DOCUMENTS

| | | | |
|---|---|---|---|
| 3,353,897 A | * 11/1967 | Lemelson | 359/621 |
| 3,357,773 A | 12/1967 | Rowland | 359/627 |
| 3,421,805 A | * 1/1969 | Rowland | 359/622 |
| 5,461,495 A | 10/1995 | Steenblik et al. | 359/463 |
| 5,629,796 A | * 5/1997 | Shanks | 359/463 |
| 6,124,975 A | * 9/2000 | Dona et al. | 359/626 |
| 6,273,473 B1 | * 8/2001 | Taylor et al. | 283/72 |

FOREIGN PATENT DOCUMENTS

| | | | |
|---|---|---|---|
| EP | 0156430 A1 | 10/1985 | C03C/17/32 |
| WO | WO9427254 | 11/1994 | G06K/19/14 |
| WO | WO9923513 | 5/1999 | G02B/1/04 |

* cited by examiner

Primary Examiner—Georgia Epps
Assistant Examiner—Saeed Seyrafi
(74) Attorney, Agent, or Firm—Michael E. Belk

(57) ABSTRACT

A lenticular device in which first and second arrays of lenticular elements are located on first and second surfaces of the device. The first and second arrays are arranged such that, when the second array is viewed through the first array, a Moiré pattern showing an enlarged image representing an element of the second array is visible, at least one of the arrays may include at least one predetermined and verifiable discontinuous variation, the variation being in a characteristic of at least one of the elements of the array with respect to the same characteristic of an adjacent element of the array, at least one of the elements may include an embossment providing the at least one of the elements with a cross-section, parallel to the surface on which the at least one of the elements is formed, which is irregular in shape compared to a parallel cross-section through a part of the at least one element not including said embossment, at least one predetermined and verifiable defect may be encoded into at least one of the first and second arrays, which defect is substantially indiscernible to an unaided observer.

19 Claims, 10 Drawing Sheets

FIG. 3(A)
FIG. 3(B)
PHILIPS
FIG. 3(C)

LENTICULAR DEVICE

FIELD OF THE INVENTION

The invention relates to a lenticular device. In particular, but not exclusively, the invention relates to a lenticular device in the form of a lenticular sheet comprising first and second arrays of optical micro-elements, which together provide a Moiré pattern. Such a lenticular sheet may be provided in or with a record carrier such as an optical disk. The presence of an expected Moiré pattern from a given sheet indicates that the object with which the sheet is associated is genuine.

BACKGROUND OF THE INVENTION

Lenticular sheets which provide Moiré patterns have previously been proposed for use as anti-counterfeit devices. A known lenticular sheet is illustrated in FIG. 1. The sheet comprises a layer 1 on a first side 2 of which is provided a lenticular array 4 of embossed convex microlenses 5 having a pitch $t_1$. On a second side 3 of the layer there is provided a lenticular array 6 of embossed convex microlenses 7 having a slightly different pitch $t_2$. Since the microlenses of arrays 4 and 6 are out of register by $t_2-t_1$ the sheet provides a Moiré pattern of period $(t_1*t_2)/|t_1-t_2|$.

When viewed from the first side 2 the Moiré pattern appears as a repetition of enlarged images of the microlenses 7 on the second side 3. Since the optical micro-elements on the second side 3 are of circular convex microlenses the enlarged images in the Moiré pattern each possess depth.

Copying lenticular sheets is difficult. It is difficult to copy precisely the positional relationship of the arrays of a sheet. Flaws in the positional relationship of the arrays of a copied sheet compared to that of an original sheet will result in the Moiré pattern of the copied sheet being different to that of the original sheet. The difference between the patterns produced by a genuine sheet and an inaccurately copied sheet can be identified either by a naked eye or a verifying device. Forged objects carrying flawed copied lenticular sheets can therefore be identified.

It is not however impossible to copy lenticular sheets such as those illustrated in FIG. 1. By accurately mapping the positional relationship of the arrays of the sheet it is possible to produce moulds carrying the negative of the arrays. The moulds can then be used to mass produce accurately copied sheets for use with forged objects.

WO 99 23513 A describes a lenticular sheet the microlenses of one of the lenticular arrays can have a cross-section in a plane perpendicular to the corresponding surface which includes at least two discontinuities, providing an annular reflective portion in each of the microlenses of that array, thereby improving the visibility of the Moiré pattern viewed through the other array.

WO 94 27254 A describes a lenticular device including a lenticular array and an array of two dimensional micro-images. The lenticular array is fixed against, or may be brought up against, the array of micro images. The micro images are formed by a printing process, in which the printing plate is formed by the exposure of a photographic resist through a microlens array of form corresponding to the lenticular array. It should be noted that such printing of images provides a different visual effect than that of embossing, in which the visual pattern is formed by varying degrees of internal reflection at different angles of incidence, rather than contrast in the image.

U.S. Pat. No. 3,357,773 describes a lenticular sheet material having a lenticular array on one side of the material and a different lenticular array on the other side. Various types of Moiré patterns are produced by variously stretching one or the other of the sides of the material before the two sides are brought together. However, such stretching, which produces continuous variations in the pitch of at least one of the arrays, produces effects which are relatively easily reproduced and difficult to verify as genuine, and was intended only to provide various decorative effects.

It would be desirable to provide a lenticular device having verifiable features which render the device more difficult to copy.

SUMMARY OF THE INVENTION

According to one aspect of the invention there is provided a lenticular device comprising:

a first array of lenticular elements on a first surface of the device; and a second array of lenticular elements on a second surface of the device, wherein the first and second arrays are arranged such that, when the second array is viewed through the first array, a Moiré pattern showing an enlarged image representing elements of the second array is visible, characterised in that at least one of the arrays includes at least one predetermined and verifiable discontinuous variation, the variation being in a characteristic of at least one of the elements of the array with respect to the same characteristic of an adjacent element of the array.

According to a another aspect of the invention there is provided a lenticular device comprising:

a first array of lenticular elements on a first surface of the device; and a second array of elements on a second surface of the device, said second array of elements consisting of substantially homogeneous elements, wherein the first and second arrays are arranged such that, when the second array is viewed through the first array, a Moiré pattern showing an enlarged image representing an element of the second array is visible, characterised in that said second array includes at least one predetermined and verifiable discontinuous variation, the variation being in a characteristic of at least one of the elements of the array with respect to the same characteristic of an adjacent element of the array.

A discontinuous variation is a variation which does not occur smoothly across a length, or width, of the array. A discontinuous variation between adjacent elements cannot be achieved merely by stretching the material on which the array is formed.

According to another aspect of the invention there is provided a lenticular device comprising:

a first array of lenticular elements on a first surface of the device; and a second array of lenticular elements on a second surface of the device, wherein the first and second arrays are arranged such that, when the second array is viewed through the first array, a Moiré pattern showing an enlarged image representing an element of the second array is visible, characterised in that at least one of the elements includes an embossment providing the at least one of the elements with a cross-section, parallel to the surface on which the at least one of the elements is formed, which has a predetermined and verifiable shape, said shape being irregular in comparison with that of a parallel cross-section through a part of the at least one element not including said embossment.

Such devices have structure which make the device more difficult to copy. Since the shape of the cross section provided by the embossment is predetermined, a flawed copy can be detected by a variation in the shape, while genuine articles can be readily verified, either by an unaided observer or by an aided observer, as will be appreciated in further detail from the following.

According to another aspect of the invention there is provided a lenticular device comprising:

a first array of elements on a first surface of the device, the elements thereof being lenticular; and a second array of elements on a second surface of the device, wherein the first and second arrays are arranged such that, when the second array is viewed through the first array, a Moiré pattern showing an enlarged image representing elements of the second array is visible, characterised in that at least one predetermined and verifiable defect is encoded into at least one of the first and second arrays, which defect is substantially indiscernible to an unaided observer.

Such a device has a security structure in the array which makes the sheets difficult to copy but produces no directly visible effect. The presence or absence of the structure must be verified by a device such as a microscope.

BRIEF DESCRIPTION OF THE DRAWING

The above and further features of the invention are set forth with particularity in the appended claims and together with advantages thereof will become clearer from consideration of the following detailed description of exemplary embodiments of the invention given with reference to the accompanying drawings, wherein:

FIGS. 3(A), 3(B) and 3(C) show different examples of embossments which may be used in the first embodiment;

DETAILED DESCRIPTION OF THE INVENTION

Figure 1:
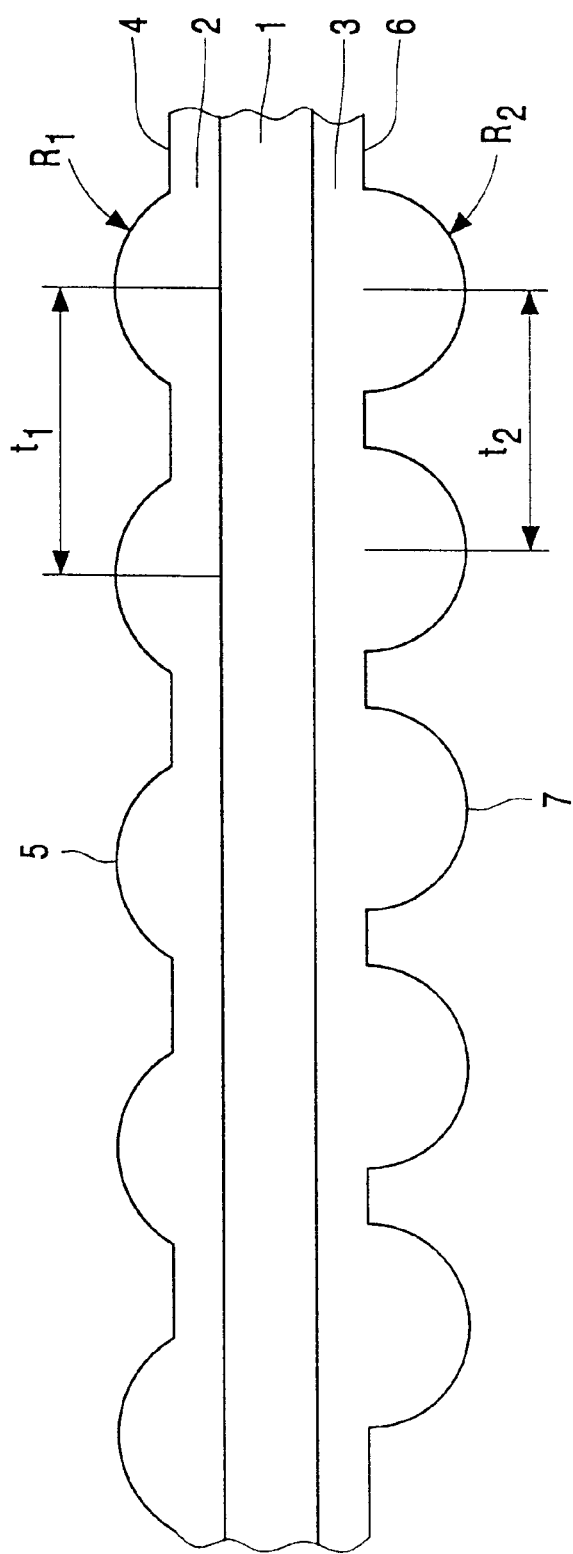
FIG. 1 shows a cross-section of a known lenticular sheet as already described herein.
Figure 2:
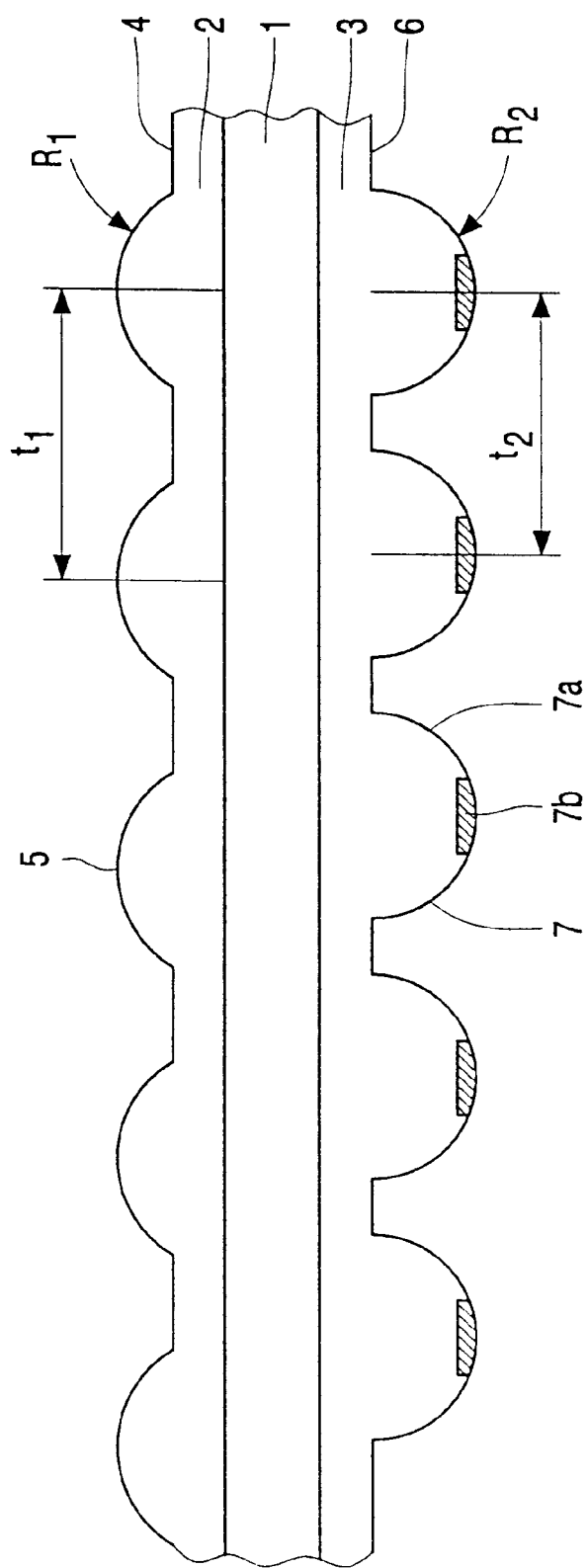
FIG. 2 shows a cross-section of a first embodiment of lenticular sheet according to the invention.

Turning now to FIG. 2 of the accompanying drawings there is shown a cross-section of a first embodiment of lenticular sheet in accordance with the invention. A central layer 1 and two side layers 2,3 either side thereof form the body of the sheet. One side layer 2 is provided with a lenticular array 4 having a large number of microlenses 5 which are arranged in a regular array pattern, with a predetermined centre to centre spacing between the microlenses of $t_1$, for example 336 $\mu$m. Each microlens 5 is in the form of a convex protrusion and acts as a convex lens when the sheet is viewed from the direction of the side layer 2. The focal length of the microlenses 5 is of the order of the thickness of the sheet. The other side layer 3 is provided with a lenticular array 6 having a large number of microlenses 7 which are arranged in a regular array pattern, with a predetermined centre to centre spacing between the microlenses of $t_2$, for example 326 $\mu$m. In any case, to produce a suitable Moiré pattern, $t_1$ must be different to $t_2$, and the difference between $t_1$ and $t_2$ must not be excessively large, for $$\frac{|t_1 - t_2|}{t_1 + t_2} < \frac{1}{10}.$$

Each microlens 7 on the other layer 3 is also in the form of a convex protrusion which may act as a convex lens if the sheet is viewable from the direction of the sidelayer 3. The sheet may not be viewable from that direction, if, for example, the side layer 3 is covered in a reflective coating. In any case, whether or not the sheet is viewable from that direction, when the sheet is viewed from the opposite direction (from the direction of the side layer 2), the microlenses 7 do not act as a lens, but as a reflective element providing different amounts of internal reflection depending on the location and angle of the incident light.

The Moiré pattern provided by the lenticular sheet has a period $(t_1 * t_2)/|t_1 - t_2|$ in the direction in which the centre to centre spacings are measured. In the above example the period of the Moiré pattern is (336*326)/(336−326)=10.95 $\mu$m. When viewed from the side of the array 3 the Moiré pattern is a repetition of enlarged images of the microlenses 7.

In this embodiment of the invention, each of the microlenses 7 includes a generally spherical or paraboloidal protrusion 7a on which is provided an identical distinctively shaped embossment 7b. The embossment 7b is preferably arranged coaxially with the protrusion 7a.

A cross section of the embossment 7b in a plane parallel to the sheet is irregular in shape compared to the general shape of the microlens cross section (which is circular). By "irregular in shape" it is meant that the embossment is not itself of a shape, such as a circle or an ellipse, which generally follows the shape of the microlens. The embossment is in the form of a raised or indented profile corresponding to a desired shape. The embossment may be in the form of a pictorial image as exemplified by the facial image shown in FIG. 3(A), a symbol as exemplified by the cross shape shown in FIG. 3(B) and/or lettering as exemplified by the name PHILIPS shown in FIG. 3(C).

The lenticular sheet illustrated in FIG. 2 provides a useful anti-counterfeit device. The provision of the embossments 7b in addition to the protrusion 7a means that the sheet is more difficult to copy. Furthermore, the enlarged images of the elements represented in the Moiré pattern visibly show a verifiable marking, generated by the embossments 7b, which may be, or become, a distinctive trade mark. To produce a faithful copy of the sheet, not only is it necessary to copy accurately the positional relationship of the arrays 4,6 but also to copy accurately the distinctively shaped portion 7b and the positional relationship of each protrusion 7a and each portion 7b within each microlens 7. A forged object bearing an inaccurately copied sheet can be identified via the resulting visual discrepancies in the Moiré pattern.

Figure 4:
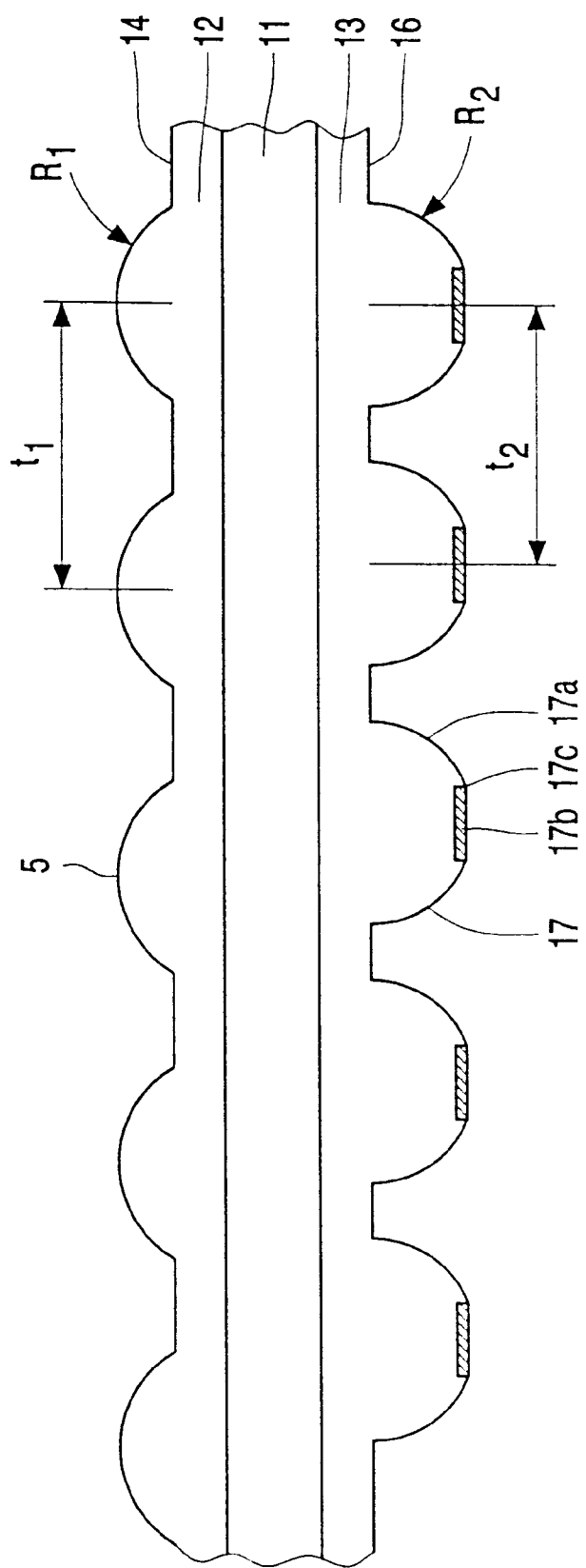
FIG. 4 shows a cross-section of a second embodiment of lenticular sheet according to the invention.

FIG. 4 illustrates a second embodiment of the invention. The lenticular sheet is similar to that shown in FIG. 2, except that the microlenses 17 are in the form of a convex, generally spherical or paraboloidal, protrusion 17a which has a flat portion 17c which is generally concentric with the microlens. Identical embossments 17b, similar to that described in relation to the first embodiment, are provided on each flat portion 17c.

Figure 5A:
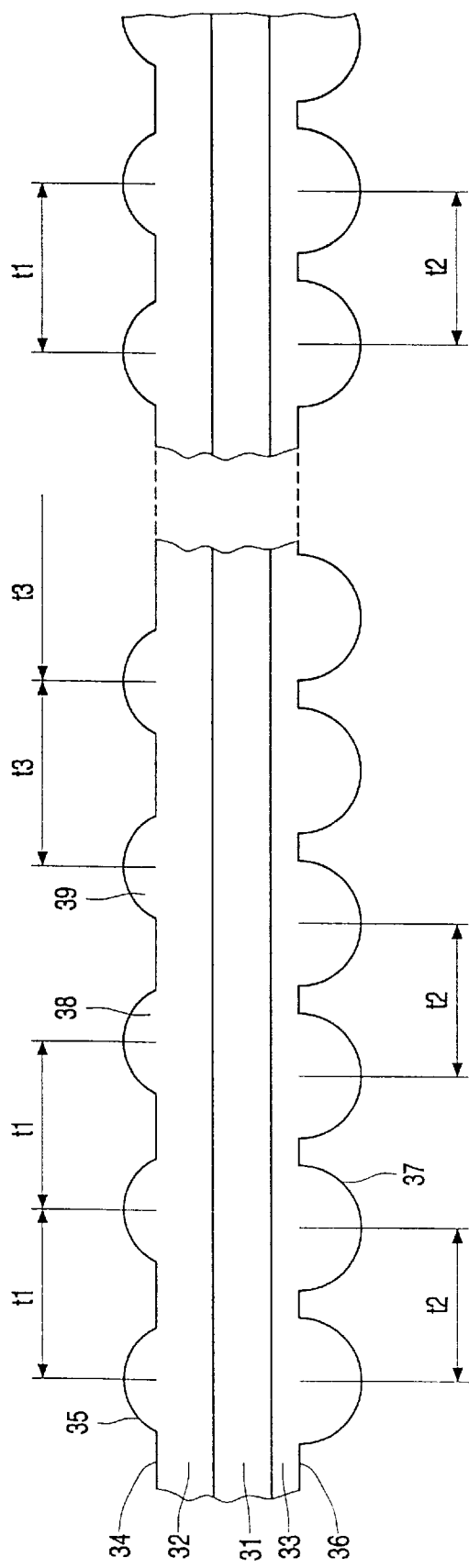
FIG. 5(A) shows a cross-section along a first direction of a third embodiment of lenticular sheet according to the invention.
Figure 5B:
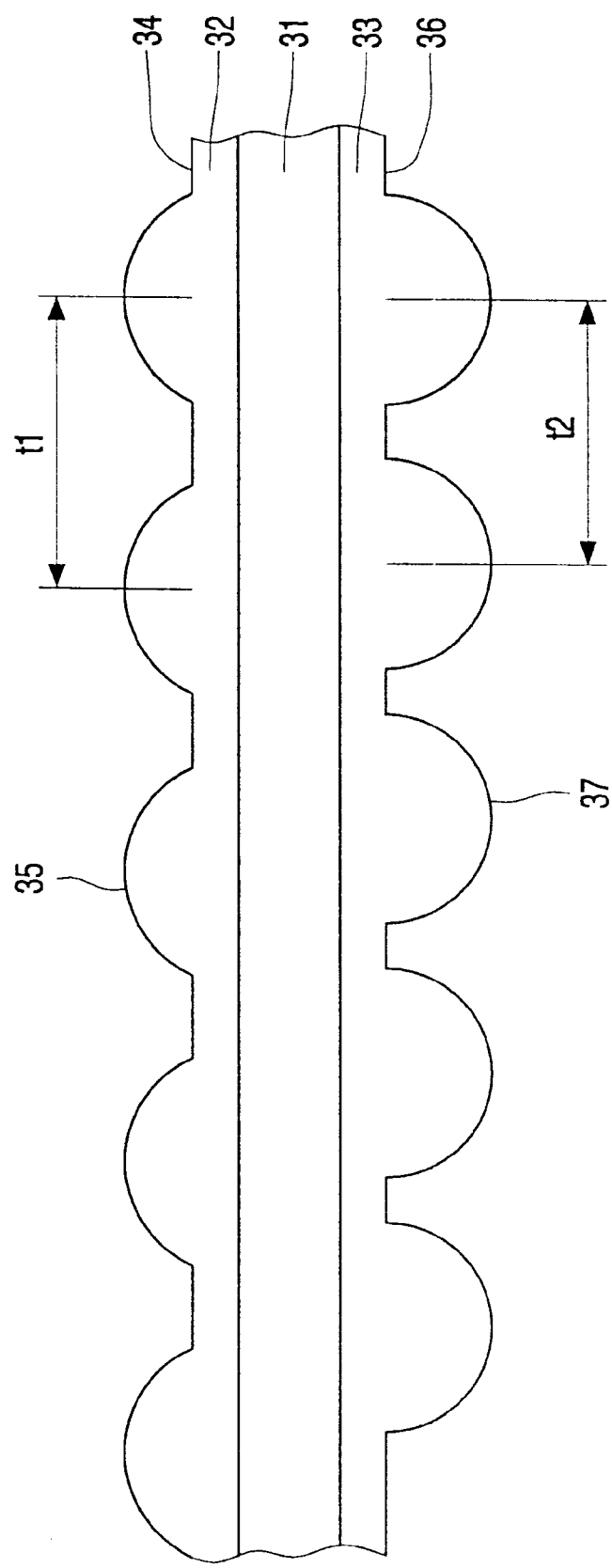
FIG. 5(B) shows a cross-section along a second direction of the third embodiment of lenticular sheet.

FIGS. 5(A) and 5(B) illustrate a third embodiment of the invention. FIG. 5a shows a cross-section of the lenticular sheet along a first direction in the sheet, whilst FIG. 5b shows a cross-section of the sheet along a direction substantially perpendicular to the first direction. As in the previously described sheets, the lenticular sheet of FIG. 5 comprises a central layer 31 and two side layers 32, 33 either side thereof. A first lenticular array 34 is provided on the first side layer 32 and a second lenticular array 36 is provided on the second side layer 33.

The first lenticular array 34 comprises a large number of spaced microlenses 35 each in the form of a convex, generally spherical or paraboloidal, protrusion which may act as a lens. Similarly, the second lenticular array 36 also comprises a large number of spaced microlenses 37 each in the form of a convex, generally spherical or paraboloidal, protrusion which may also act as a lens.

The microlenses 35 are arranged differently along the first direction compared to their arrangement along the second direction, perpendicular to the first direction. Along the first direction there are regions of the first array 34, which are preferably of a size sufficient to show an enlarged image representing at least one of the microlenses 37 in the second array 36 substantially entirely, within which the spacing (pitch) between the microlenses 35 is $t_1$, and different regions of the array, which are also preferably of a size sufficient to show an enlarged image representing at least one of the microlenses 37 in the second array 36 substantially entirely within which the spacing between the microlenses 35 is $t_3$. In certain areas of the array 34 intermediate the different regions, for example in the area of microlenses 38, 39 shown in FIG. 5(A), a discontinuous variation in the spacing, from $t_1$ to $t_3$, occurs. However, as shown in FIG. 5(B), along the second direction in the sheet, the centre to centre spacing of neighbouring microlenses, in this example, is always $t_1$.

The microlenses 35 in the array 34 may thus be arranged in a pattern of alternating regions containing groups of microlenses arranged in squares of sidelength $t_1$ and regions containing groups of microlenses arranged in rectangles of sidelengths $t_1$ and $t_3$.

The spacing of the centres of the microlenses 37 in the array 36 is $t_2$ in both the first and second directions. The values of $t_1$ and $t_3$ are both slightly different to the value of $t_2$.

Figure 6:
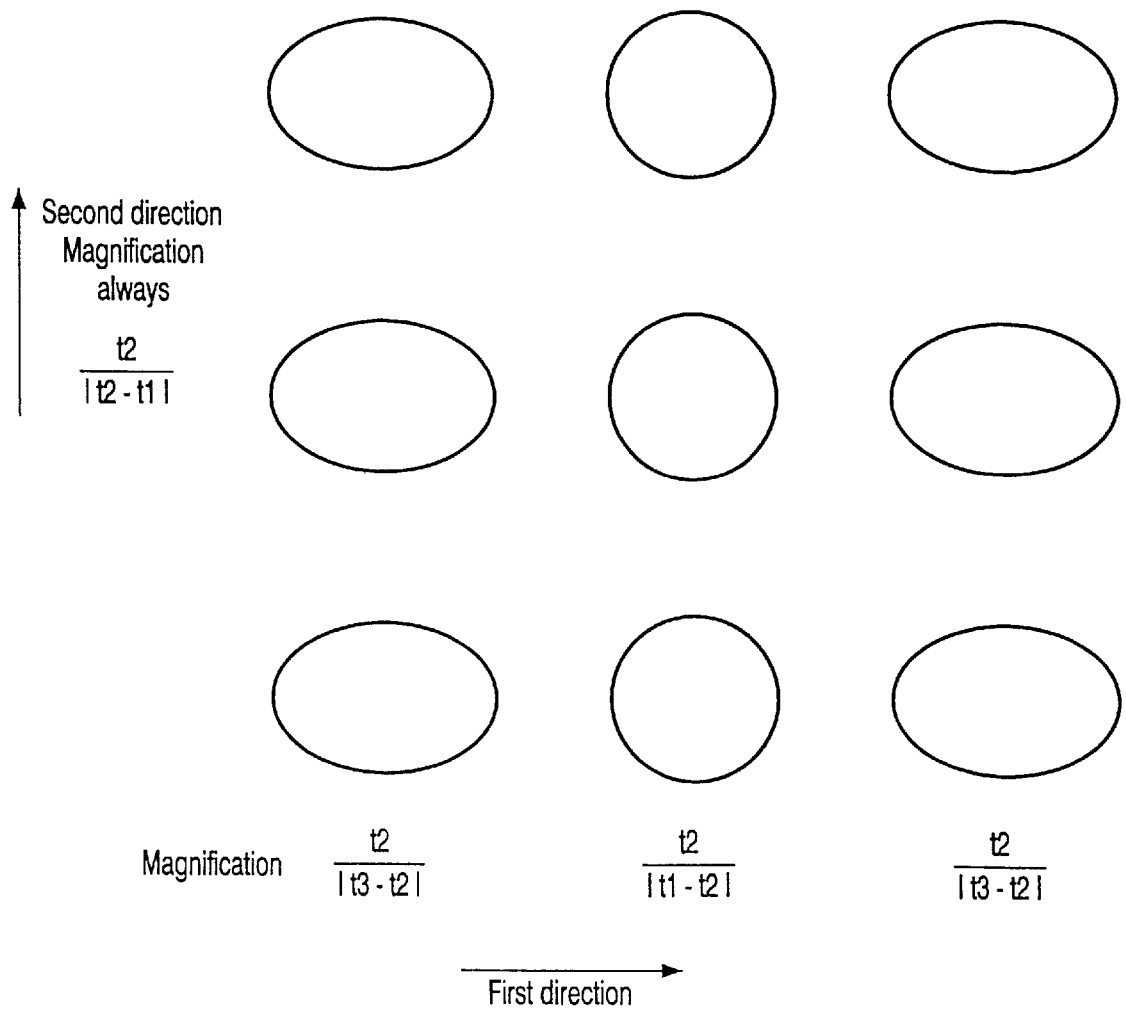
FIG. 6 shows a schematic illustration of a Moiré pattern produced by the third embodiment of lenticular sheet.

A schematic illustration of a Moiré pattern provided by the sheet and which is viewable from above the first array 34 is shown in FIG. 6. For this particular example, the value of $|t_1-t_2|$ is greater than the value of $|t_2-t_3|$. Along any given direction, the value of the magnification of the images is dependent upon two factors, i) the spacing $t_2$ of the microlenses 37 in the second array 36 and ii) the difference in the spacing $t_1$ or $t_3$ of the first array 34 and the second array 36. Along the second direction the magnification is always $t_2/|t_1-t_2|$ because the spacing of the microlenses 37 in the second array 36 is always $t_2$ and the difference in spacing of the first 34 and second 36 arrays is always $|t_1-t_2|$.

Along the first direction the spacing of the microlenses 37 in the second array 36 is again always $t_2$ but the difference in the spacing of the first 34 and second 36 arrays varies and is either $|t_1-t_2|$, or $|t_2-t_3|$ depending upon whether the spacing of the microlenses 35 in the first array 34 is $t_1$ or $t_3$. The value of the magnification therefore alternates in value between the different regions and is either $t_2/|t_1-t_2|$ or $t_2/|t_2-t_3|$.

The Moiré pattern appears as a repetition of magnified images representing the microlenses 37. Some of the enlarged images appear circular in shape and others of the enlarged images appear elliptical in shape. These differences in shape occur because the magnification varies along the first direction. Where the magnification is $t_2/|t_1-t_2|$ in both directions the enlarged images of the microlenses 37, which themselves have circular cross sections parallel to the plane of the sheet, appear circular. Where the magnification is $t_2/|t_2-t_3|$ in the first direction and $t_2/|t_1-t_2|$ in the second direction because $t_2/|t_2-t_3|$ than $t_2/|t_1-t_2|$ the enlarged images of the microlenses 37 are elongated and thus appear elliptical. In effect, the discontinuous change in spacing between the two arrays in the first direction results in a corresponding discontinuous change in the images from circular to elliptical.

A similar Moiré pattern containing images of the protrusions 35 can be observed if the sheet is viewed from the opposite direction, that is from above the second array 36.

By discontinuously varying the difference in the spacing of the arrays 34 and 36 in the first direction a striking Moiré pattern is formed. More complicated patterns can be formed if the difference in the spacing of the first array 34 and second array 36 is discontinuously varied in more than one direction.

The sheet illustrated in FIGS. 5(A) and 5(B) is more difficult to copy because of the need to accurately map and reproduce the regularly varying positional relationship of the first and second arrays. The Moiré pattern provided by the sheet is striking and easily recognisable. A forged object bearing an inaccurately copied sheet can be identified via the resulting visual discrepancies in the Moiré pattern.

It is not necessary that both the first array 34 and the second array 36 are arrays of microlenses. One of the arrays 36 can comprise a set of any substantially homogeneous elements suitable to act as objects to be imaged by the other array 34. For instance, one of the arrays 36 may comprise distinctively shaped embossments such as those discussed above with respect to FIGS. 2 to 4, or an array of micro-images printed onto the appropriate layer. The pitch variations causing the alterations in magnification may then occur either in the array of microlenses or the other of the arrays.

Figure 7:
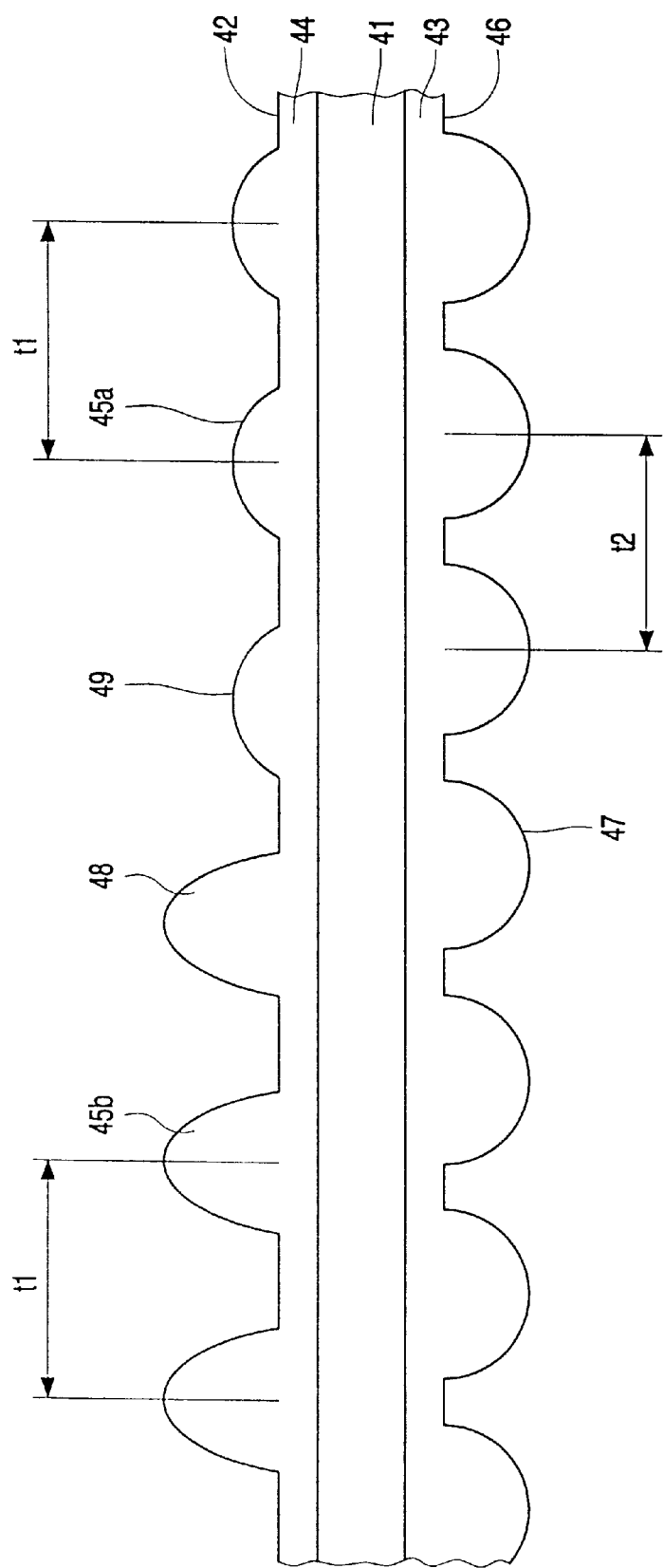
FIG. 7 shows a cross-section of a fourth embodiment of lenticular sheet according to the invention.

FIG. 7 illustrates a fourth embodiment of the invention. A central layer 41 and a first side layer 42 and a second side layer 43 either side thereof form the body of the sheet. The first side layer 42 is provided with a first lenticular array 44. The first lenticular array 44 comprises at least one group of first microlenses 45a which act as lenses and at least one group of second microlenses 45b which are different in shape, and hence have a different focal strength, than the first microlenses 45a, and which also act as lenses. The first microlenses 45a may for example be generally spherical in shape, and the second microlenses 45b may for example be generally paraboloidal in shape and have a greater height than microlenses 45a. Thus, a discontinuous variation in focal strength (and height and/or form) of the microlenses occurs between microlenses 48 and 49, as illustrated in FIG. 7. The centre to centre spacing of the first microlenses 45a and the centre to centre spacing of the second microlenses 45b are however regular and equal to $t_1$.

The second side layer 43 is provided with a lenticular array 46. The lenticular array 46 comprises regularly spaced spherical or paraboloidal protrusions 47 each having a centre to centre spacing $t_2$ which is slightly different than $t_1$.

Preferably, the array 44 comprises groups of microlenses 45a interspersed with groups of microlenses 45b in a predetermined pattern. Each group preferably contains enough embossed microlenses to provide an enlarged image representing at least one of the microlenses 47 of the other array 46.

The difference in shape of the microlenses 45a and 45b is specifically chosen so that the microlenses 45a and the microlenses 45b have different focal lengths, whilst both the focal lengths remain of the order of the thickness of the sheet.

When viewed from above the array 44 the Moiré pattern provided by the sheet is striking. The pattern is a repetition of magnified images of the microlenses 47 with, as a result of the difference in focal length of the microlenses 45a and the microlenses 45b, the plane of the enlarged images of the microlenses 47 imaged by the microlenses 45a appearing non-coplanar with the plane of the enlarged images of the microlenses 47 imaged by the microlenses 45b.

The microlenses 45a and 45b can be of any suitable shape, the only requirement is that their shapes differ to an extent necessary to provide a difference in focal strength.

The lenticular sheet illustrated in FIG. 7 is more difficult to copy because, as well as the need to copy the positional relationship between the arrays 44 and 46 it is also necessary to copy the different shaped microlenses 45a and 45b and also the spatial arrangement of the microlenses 45a and 45b. The Moiré pattern provided by the sheet is striking and easily recognisable. A forged object bearing an inaccurately copied sheet could be identified via the resulting visual discrepancies in the Moiré pattern.

Figure 8:
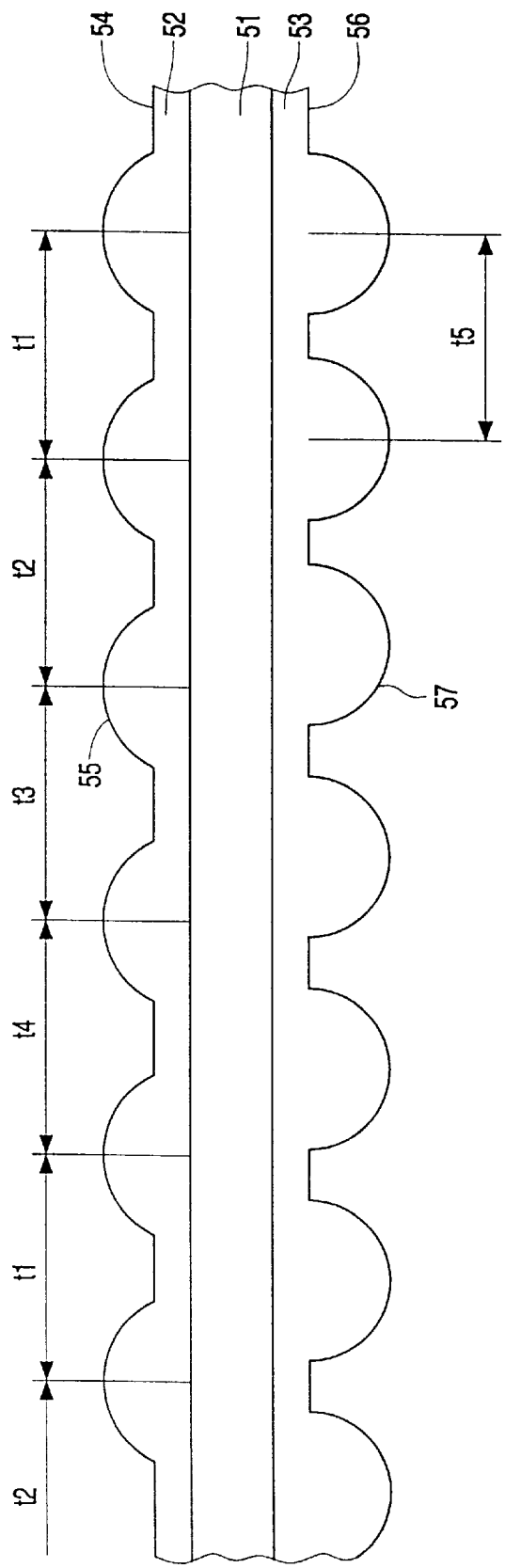
FIG. 8 shows a cross-section of a fifth embodiment of lenticular sheet according to the invention.

FIG. 8 illustrates a fifth embodiment of the invention. The sheet includes a central layer 51 and two side layers 52, 53. In a lenticular array 54 arranged on the first side layer 52 of the sheet the centre to centre spacing of neighbouring microlenses 55 is not constant but varies in a discontinuous but limited manner, with some, or all, of the microlenses being located only slightly offset from their points in the regularly-spaced array. The variations in positioning are limited to within ±5 μm of the points of the regularly-spaced array, to ensure that the variations do not have a readily discernible visible effect on the Moiré pattern produced. Some blurring of the Moiré pattern may occur, but this is generally indiscernible to the naked eye.

In this specific example, for a line of five consecutive microlenses 55, the distance between a first pair of neighbours 55a, 55b is $t_1$ between a second pair of neighbours 55b, 55c is $t_2$, between a third pair of neighbours 55c, 55d is $t_3$ and between a fourth pair of neighbours 55d, 55e is $t_4$. The spacing $t_1$ is 336 μm and the spacings $t_2$, $t_3$ and $t_4$ are all within ±5 μm of 336 μm and the average of all spacings is $t_1$ (336 μm). For example, $t_2$=340 μm, $t_3$=333 μm and $t_4$=335 μm. This pattern is repeated in a limited portion of, or across the whole of, the first layer 52.

The spacing between microlenses 57 in an array 56 on the second side layer 53 is $t_5$, which is different to the average spacing of the microlenses of the other array 54, for example 326 μm.

As has been described in greater detail above the form of the Moiré pattern provided by the sheet is dependent upon the difference in spacing of the two arrays 54 and 56.

When viewed from above the first side layer 52 the Moiré pattern appears as a repetition of enlarged images of the microlenses 57 or if viewed from above the second side layer 53 enlarged images of the microlenses 55. Either pattern includes fine structure which derives from the above described microscopic variations in the pitch of the array 54. The varying pitch can only be detected with an optical device such as a microscope. In effect, the sequence of microscopic pitch variations represent a security "code" encoded into the array 54 the presence of which cannot be detected by the naked eye.

It is to be noted that the pitch need not constantly vary as in the example described above. A number of regularly spaced microlenses correctly placed in the array may be followed by one, or more, microlenses which is offset from its correct position in the microlens array. For example, every twentieth microlens in a line of microlenses may be offset in such a manner to provide a verifiable and discontinuous pitch variation sequence. Furthermore, the coding sequence may be reversed to provide further security.

The lenticular sheet illustrated in FIG. 8 is more difficult to copy because of the extra difficulty involved in decoding and accurately reproducing the microscopic pitch variations encoded into the original sheet. A forged object bearing a copied sheet having the same general arrangement as an original sheet and which provides the same visible Moiré pattern but in which the coded pitch variations are not present or are poorly reproduced can be identified by a suitable verifying machine such as a microscope.

The specific sequence of pitch variations described above are exemplary only. Other possible sequences of variations will be apparent to those skilled in the art. In fact, only a single element need be offset from its correct position in the array, in order to provide a verifiable encoded pitch variation.

It is not necessary that both the first array 54 and the second array 56 are arrays of microlenses. One of the arrays can comprise a set of any substantially homogeneous elements suitable to act as objects to be imaged by the other array 54. For instance, one of the arrays 56 may comprise distinctively shaped embossments such as those discussed above with respect to FIGS. 2 to 4, or an array of microimages printed onto the appropriate layer. The coded pitch variations may then occur either in the array of microlenses or the other of the arrays.

Figure 9:
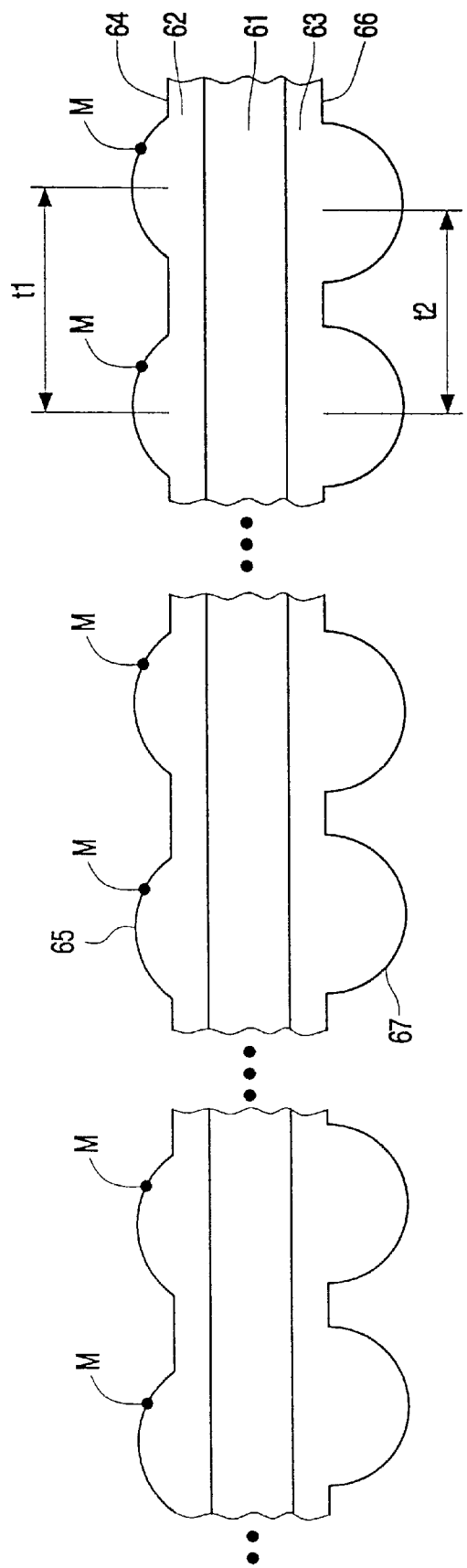
FIG. 9 shows a cross-section of a sixth embodiment of lenticular sheet according to the invention.

FIG. 9 illustrates a sixth embodiment of the invention. The lenticular sheet includes a central layer 61 and two side layers 62, 63. The array 66 of microlenses 67 formed on the second layer 63 is identical to the equivalent array illustrated in previous Figures. The microlenses 65 arranged in the array 64 on the first side layer 62 have a centre to centre spacing $t_1$. Each of the microlenses 65 includes a predetermined and verifiable embossment M formed at a predefined location, or locations, thereon. The embossment M may in its simplest form be either a small protrusion or a small depression, but is preferably of a mere complex form, such as a pictorial image, a symbol and/or lettering. The location of the embossment M on the microlenses may be rotated after a certain number of microlenses, to add a coding sequence in the orientation of the embossment.

It is not essential that each microlens 65 includes the embossment M. The microlenses 65 can be marked in any suitable pattern, for instance only a single, or say every fifth microlens may be marked. If the embossment M is included on a substantial proportion of the microlenses 65, the lenticular sheet is preferably arranged to ensure that a Moiré pattern in which an enlarged view of the embossment M would otherwise be visible, is not visible to an unaided observer. This may be achieved by the appropriate placement of the sheet in the object it is validating, or by including a substantially opaque layer on the side of the microlenses 67. Indeed, the array 66 may consist of optical micro-elements which are not microlenses, but embossments or printed images. Genuine sheets including the embossments M can however be detected and validated by use of a verifying device such as a microscope.

The above-described microscopic pitch deviations or the embossments M (referred to below as "defects") are substantially indiscernible to an unaided observer. By this, we mean that the features are not readily resolvable by the naked human eye. The features should therefore individually be smaller than approximately 0.1 mm, or individually have a shifting effect on the Moiré pattern smaller than approximately 0.1 mm, when viewed by the naked human eye at a distance of 20 cm.

The defects which are encoded into an array of a lenticular sheet may be placed in a predetermined location with respect to the Moiré pattern produced by the sheet. This feature can be used to allow the defect to be more readily identified by a verifier, and as a further level of validation. For example, in the above-described Moiré patterns, the images formed are generally circular, being images of the microlenses on the opposite side of the sheet to the viewing side. The defect, or defects, may be encoded into those microlenses which appear in the middle of one of the circular images appearing in the Moiré pattern. A predetermined positional relationship between a defect and the Moiré pattern is also useful in that the defect may be used as a reference point in the array which in conjunction with a verifying device can be used to confirm the authenticity of an object carrying the lenticular sheet. An example of such a verifying device is a transparent sheet with a reference pattern imprinted thereon which is a reproduction or representation of the Moiré pattern provided by a given lenticular sheet. The location of the defect may be selected such that, when the verifying device is held in a predetermined orientation above the lenticular sheet with a given alignment mark of the verifier directly above a defect, the Moiré pattern produced by the lenticular sheet is observed as being coincident with the reference pattern printed on to the verifier. The Moiré pattern produced by a copied lenticular sheet in which the location of the defect is inaccurate compared to the original sheet would not be coincident with the pattern of the verifier.

All the embodiments of lenticular sheets described herein may be embedded in a body to inhibit copying of the sheets or attached to an object such as a CD cartridge by means of an adhesive layer. The surface, or surfaces, on which the validating optical micro elements are formed, may be protected by a transparent protective layer of material having a refractive index different than that of the sheet. The layer is preferably strongly adhered to the surface it protects, such that it cannot be removed without defacing the validating optical micro elements, thus preventing direct copying of the lenticular device itself.

It is to be understood that the embodiments described herein are exemplary only and that modifications and variations such as will occur to those possessed of the appropriate knowledge and skills may be made without departure from the scope of the invention as set forth in the appended claims.

The microlenses or other optical micro elements need not be arranged in the square or rectangular arrays described above; they may also be arranged in triangular or hexagonal arrays.

It is envisaged that lenticular devices incorporating validating features from two or more of any of the embodiments described herein may also be desired.

The terms "microlens" and "lenticular" are used herein to indicate the form, and only in some cases the necessary function, of the elements described. In various embodiments, one of the "microlens" arrays need not act as lenses, but are used in order to provide a verifiable reflected image in the Moiré pattern seen through the other array of "microlenses". The convex form of the "microlenses" is used to provide verifiable and distinct images in the Moiré pattern generated by reflections at various locations in the "microlenses" with varying amounts of reflection at varying angles of incident light.

Similarly, the term "embossment" as used herein is used to indicate an optical micro-element formed by shaping, rather than by the use of surface contrast. The formation of an embossment on a microlens to form a master from which a mould may be produced may be achieved either by embossing each microlens (or a negative thereof), once formed, individually, or by forming the embossed microelement at the same time as the lens is formed. The microlenses themselves, or negatives thereof, may be individually embossed in the master, or may be formed by embossing part-cylindrical grooves first in a first direction with defined spacings and then in the perpendicular direction with defined spacings and to the same depth, thereby forming a negative of the microlens array as desired. Lenticular sheets such as those shown in the Figures may be mass produced using moulds which have the negative shape of the lenticular arrays. A suitable technique for making lenticular sheets such as those shown is discussed in EP-A- 0156430.

What is claimed is:

1. A lenticular device comprising:
    a first array of lenticular elements on a first surface of the device; and
    a second array of lenticular elements on a second surface of the device,
        wherein the first and second arrays are arranged such that, when the second array is viewed through the first array, a Moiré pattern showing an enlarged image representing an element of the second array is visible,
        characterised in that at least one of the arrays includes at least one predetermined and verifiable discontinuous variation, the variation being in a characteristic of at least one of the elements of the array with respect to the same characteristic of an adjacent element of the array.

2. A lenticular device as claimed in claim 1, wherein the at least one variation comprises a variation in focal strength, whereby a Moiré pattern is produced in which images are formed at different apparent heights relative to the first surface.

3. A lenticular device as claimed in claim 1, wherein the at least one variation comprises at least one variation in pitch between the elements.

4. A lenticular device as claimed in claim 3, wherein the at least one variation in pitch occurs cyclically along a pitch direction.

5. A lenticular device as claimed in claim 3, wherein the at least one variation in pitch is limited to ensure that the elements of the array in which the at least one variation occurs are generally arranged in a regularly-spaced array, whereby a Moiré pattern is produced wherein the at least one variation in pitch is substantially indiscernible to an unaided observer.

6. A lenticular device as claimed in claim 5, wherein the pitch is varied by different amounts in a predetermined sequence.

7. A lenticular device as claimed in claim 6, wherein the location of an element in the array is varied from the regularly-spaced array, and the majority of the elements in the array are properly arranged in the regularly-spaced array.

8. A lenticular device as claimed in claim 1, wherein the first and second arrays are arranged, and said at least one variation occurs, such that a Moiré pattern is produced in which a plurality of enlarged images each representing one element of said second array are visible, and wherein a change in or between the enlarged images caused by the at least one variation is visible to an unaided observer.

9. A lenticular device comprising:
   a first array of lenticular elements on a first surface of the device; and
   a second array of lenticular elements on a second surface of the device,
      wherein the first and second arrays are arranged such that, when the second array is viewed through the first array, a Moiré pattern showing an enlarged image representing an element of the second array is visible,
      characterised in that at least one of the elements includes an embossment providing the at least one of the elements with a cross-section, parallel to the surface on which the at least one of the elements is formed, which has a predetermined and verifiable shape, said shape being irregular in comparison with that of a parallel cross-section through a part of the at least one element not including said embossment.

10. A lenticular device as claimed in claim 9, wherein the said element comprises a first portion defining a lens-like protrusion and a second portion defining said embossment.

11. A lenticular device as claimed in claim 9, wherein the second array comprises a plurality of elements each comprising said embossment in substantially identical form, such that the form of the embossment is visible in said Moiré pattern.

12. A lenticular device as claimed in claim 9, wherein said embossment is provided in said first array and is arranged to be substantially indiscernible to an unaided observer.

13. A lenticular device according to claim 9, wherein said embossment comprises a pictorial image, a symbol and/or lettering.

14. A lenticular device comprising:
   a first array of elements on a first surface of the device, the elements thereof being lenticular; and
   a second array of elements on a second surface of the device,
      wherein the first and second arrays are arranged such that, when the second array is viewed through the first array, a Moiré pattern showing an enlarged image representing elements of the second array is visible,
      characterised in that at least one predetermined and verifiable defect is encoded into at least one of the first and second arrays, which defect is substantially indiscernible to an unaided observer.

15. A lenticular device according to claim 14, wherein said defect is in the spacing of the elements of at least one of the arrays with respect to each other.

16. A lenticular device according to claim 14, wherein said defect is a marking on a lenticular element of the first array.

17. A set of lenticular devices according to claim 14, wherein the defect is similarly located in each of said devices such that there is a predetermined positional relationship between the defect and the Moiré pattern which is present in each of said devices.

18. A lenticular device comprising:
   a first array of lenticular elements on a first surface of the device; and
   a second array of elements on a second surface of the device, said second array of elements consisting of substantially homogeneous elements,
      wherein the first and second arrays are arranged such that, when the second array is viewed through the first array, a Moiré pattern showing an enlarged image representing an element of the second array is visible,
      characterised in that said second array includes at least one predetermined and verifiable discontinuous variation, the variation being in a characteristic of at least one of the elements of the array with respect to the same characteristic of an adjacent element of the array.

19. A lenticular device according to claim 18, wherein the variation is a variation in pitch.

* * * * *